Nov. 15, 1938.  M. MORGAN  2,136,947
COUPLING
Filed March 26, 1936
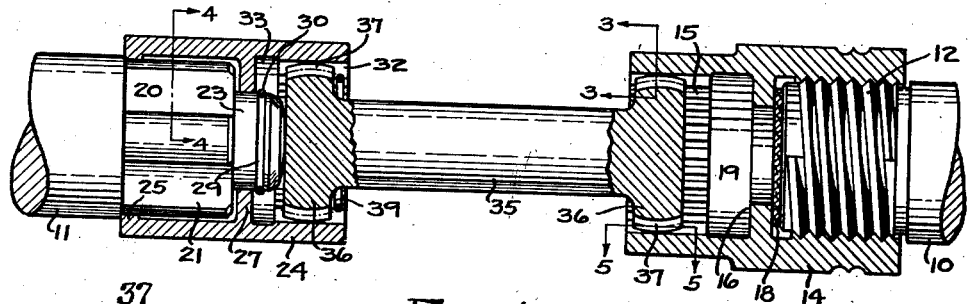
Fig. 1
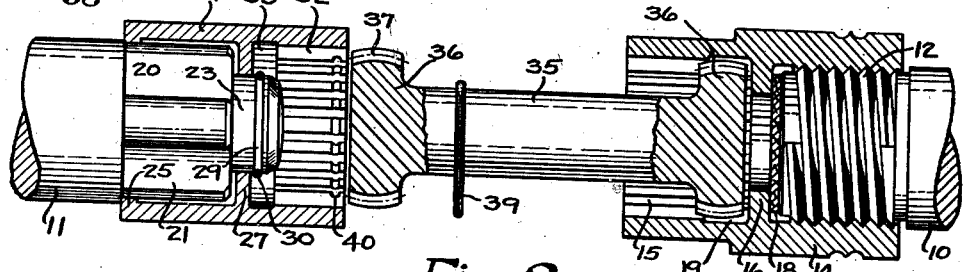
Fig. 8.    Fig. 2
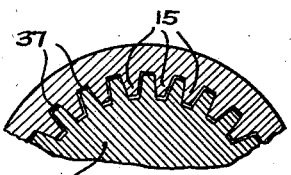
Fig. 3
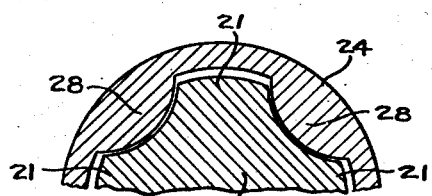
Fig. 4
Fig. 5
Fig. 6    Fig. 7
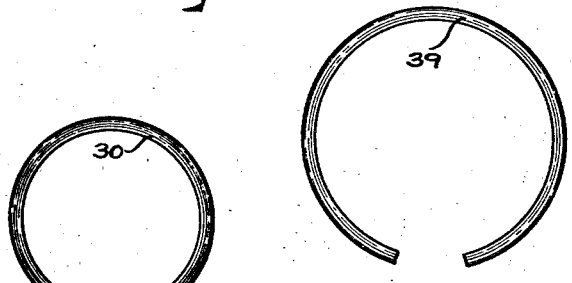
INVENTOR
MYLES MORGAN
BY Albert G. Blodgett
ATTORNEY Patented Nov. 15, 1938

2,136,947

UNITED STATES PATENT OFFICE 2,136,947

COUPLING

Myles Morgan, Worcester, Mass., assignor to Morgan Construction Company, Worcester, Mass., a corporation of Massachusetts Application March 26, 1936, Serial No. 70,918

2 Claims. (Cl. 64—9)

This invention relates to couplings, and more particularly to couplings of the type adapted to connect two rotary shafts and to transmit power from one shaft to the other.

It has been proposed heretofore to mount an external gear on one shaft and to surround this gear with an internal gear which is mounted on the other shaft, the two gears having the same number of teeth. With devices of this type, the shafts must be aligned as accurately as possible, and the couplings will operate satisfactorily under these conditions. In some cases however, it is not feasible to align the shafts. For example, in rolling mills it is the practice to drive the rolls by means of pinion shafts which rotate about fixed axes, the rolls themselves being adjustable transversely. In a construction of this type the coupling must be capable of accommodating a considerable misalignment, and prior couplings of the external and internal gear type have been unsuitable for this purpose, although such couplings have certain practical advantages over other forms.

It is accordingly one object of the invention to provide a coupling of the external and internal gear type which will operate satisfactorily despite substantial misalignment of the driving and driven shafts.

It is a further object of the invention to provide a coupling of the external and internal gear type which is suitable for use in driving an adjustable roll in a rolling mill.

It is a further object of the invention to provide a coupling which is suitable for use in driving a roll in a rolling mill, and which will connect with the roll in a simple manner and without requiring an expensive construction for the roll.

It is a further object of the invention to provide a coupling which is suitable for use in driving a roll in a rolling mill, and which is so constructed as to facilitate the removal and replacement of the roll.

It is a further object of the invention to provide a coupling which is comparatively simple and inexpensive to manufacture, and capable of transmitting a large torque between misaligned shafts.

With these and other objects in view, as will be apparent to those skilled in the art, the invention resides in the combination of parts set forth in the specification and covered by the claims appended hereto.

Referring to the drawing illustrating one embodiment of the invention and in which like reference numerals indicate like parts.

Fig. 1 is a longitudinal section through a coupling shown connecting a pinion shaft to a roll;

Fig. 2 is a view similar to Fig. 1, showing the coupling spindle withdrawn to permit removal of the roll;

Fig. 3 is an enlarged section on the line 3—3 of Fig. 1;

Fig. 4 is an enlarged section on the line 4—4 of Fig. 1;

Fig. 5 is an enlarged section through one of the external gear teeth, the section being taken on the line 5—5 of Fig. 1;

Fig. 6 is a detail of a locking ring;

Fig. 7 is a detail of a second locking ring; and

Fig. 8 is a fragmentary end elevation of the external gear teeth.

In the drawing I have shown a coupling adapted to connect a pinion shaft 10 to a roll 11 of a rolling mill. The shaft 10 is provided with an externally screw-threaded end portion 12 on which is mounted a sleeve 14. The sleeve 14 is screw-threaded internally at its inner end to fit the shaft 12, and the outer end of the sleeve extends beyond the shaft and is provided with internal gear teeth 15. Intermediate its length the sleeve 14 is provided internally with an annular flange 16 which engages a thin dick 18 of fiber or other suitable material located between the flange and the end of the shaft 10. A circumferential groove or recess 19 is preferably formed in the interior of the sleeve between the teeth 15 and the flange 16 to facilitate the machining of the gear teeth.

The roll 11 is provided with a wabbler 20 having four longitudinal ribs 21 the tops of which are preferably shaped to conform with a cylindrical surface concentric with the roll. On the outer end of the wabbler there is provided a cylindrical projection 23 smaller in diameter than the wabbler and concentric with the roll. In order to drive the roll there is provided a sleeve 24 having at its inner end an internal annular flange 25 which is bored cylindrically to fit closely over the tops of the wabbler ribs 21. Intermediate its length the sleeve 24 is provided internally with an annular flange 27 which is bored cylindrically to fit closely over the projection 23. With this construction the sleeve is accurately centered on the roll. Between the flanges 25 and 27, the sleeve is provided internally with longitudinal ribs 28 (Fig. 4) which fit between the wabbler ribs 21 and serve to transmit driving torque from the sleeve to the roll. As indicated in Fig. 4, a slight clearance is preferably allowed between the ribs 21 and 28, so that these parts need not be made to accurate dimensions.

In order to retain the sleeve 24 in place on the roll, the projection 23 is provided with a circumferential groove 29 arranged to receive a resilient locking ring 30. At assembly the ring 30 projects above the surface of the projection 23 outwardly of the flange 27, and thus prevents outward movement of the sleeve. The outer end of the sleeve 24 extends beyond the projection 23 and is provided with internal gear teeth 32. A circumferential groove or recess 33 is preferably formed in the interior of the sleeve between the teeth 32 and the flange 27 to facilitate the machining of the gear teeth.

In order to transmit driving torque from the pinion shaft sleeve 14 to the roll sleeve 24, these parts are connected by a coupling spindle 35. The end portions of this spindle are somewhat enlarged in diameter to form gears 36 provided with external gear teeth 37 which interfit with the teeth 15 and 32 on the inside of the sleeves 14 and 24 respectively, the number of external teeth at each end corresponding with the number of internal teeth in the corresponding sleeve. The spindle is held in place longitudinally by means of a resilient locking ring 39 which fits in a circumferental groove 40 formed in the gear teeth 32 near their outer ends.

Since the roll 11 is adjustable transversely by suitable means (not shown), the coupling must be capable of operating satisfactorily despite considerable misalignment between the roll and the pinion shaft 10. In the embodiment illustrated this is made possible by the novel shape of the external gear teeth 37. As indicated particularly in Figs. 1 and 2, the pitch surfaces of the gears 36 are made outwardly convex, the teeth 37 curving inwardly at each end toward the axis of the spindle. Preferably these pitch surfaces are spherical, with their centers located on the axis of the spindle. Furthermore, the spaces between the gear teeth 37 are preferably uniform in shape and size throughout the lengths of the teeth (as shown in Fig. 8). This makes it possible to form these tooth spaces by means of the usual type of rotary milling cutter, any suitable means being utilized to provide the necessary curvilinear relative motion between the gear and the cutter. In addition, it will be noted from Fig. 3 that the thickness of the gear teeth 37 decreases in a radially outward direction.

It will now be recognized that since the gear teeth 37 curve inwardly at each end and the diameter of the pitch surface decreases, the thickness of the teeth will be less at the ends than at the center. This endwise tapering of the teeth is even more pronounced by reason of the fact that the tooth spaces do not taper but on the contrary are of uniform width. As a result of the curvature of the gear teeth, their decreasing thickness in a radially outward direction and their endwise taper along the pitch surface, each tooth will have a very pronounced endwise taper at its intersection with the cylindrical pitch surface of the surrounding internal gear. This is illustrated in Fig. 5, which shows a section through one of the teeth 37. As indicated in Fig. 3, a slight clearance is provided both radially and circumferentially between the external and internal gear teeth.

The operation of the invention will now be apparent from the above disclosure. Power is transmitted from the pinion shaft 10 and sleeve 14 to the spindle 35, and from the spindle to the sleeve 24 and the roll 14. As the roll is adjusted transversely, its axis will be moved out of line with the axis of the pinion shaft. At the same time the spindle 35 will assume an inclined position with its axis at an angle with the axes of both the pinion shaft and the roll. Such as angular position is made possible and binding of the gear teeth is avoided by the curved and endwise tapering shape of the external gear teeth 37. The sleeve 24 is accurately centered on the roll by the flanges 25 and 27, which engage the outer surfaces of the ribs 21 and the projection 23 respectively. These cooperating surfaces are comparatively easy to machine. The ribs 28 engage the sides of the ribs 21 to transmit the driving torque, and since these parts are not depended upon for centering purposes, they need not be formed with great accuracy. Removal of the locking ring 39 will permit endwise withdrawal of the roll. If the roll is mounted for removal in a lateral direction, the spindle 35 will first be withdrawn endwise to clear the end of the sleeve 24, as shown in Fig. 2.

The entire coupling is comparatively simple and inexpensive to manufacture and thoroughly reliable in operation.

Having thus described my invention, what I claim as new and desire to secure by Letters Patent is:

1. A coupling comprising an outer member shaped to provide an annular series of internal gear teeth having a cylindrical pitch surface, and an inner member shaped to provide an annular series of external gear teeth which interfit with the internal teeth, the pitch surface of the external gear teeth being spherical, and the external gear teeth decreasing in thickness in a radially outward direction.

2. A coupling comprising an outer member shaped to provide an annular series of internal gear teeth having a cylindrical pitch surface, and an inner member shaped to provide an annular series of external gear teeth which decrease in thickness in a radially outward direction and which interfit with the internal teeth, the pitch surface of the external gear teeth being spherical, and the spaces between the external gear teeth being uniform in shape and size throughout a substantial part of the lengths of the teeth.

MYLES MORGAN.